United States Patent [19]

Spicer et al.

[11] Patent Number: 5,219,129
[45] Date of Patent: Jun. 15, 1993

[54] TAPE THREADING MECHANISM

[75] Inventors: Barry K. Spicer, Berthoud; Christian A. Todd, Thornton, both of Colo.

[73] Assignee: Storage Technology Corporation, Louisville, Colo.

[21] Appl. No.: 839,319

[22] Filed: Feb. 20, 1992

[51] Int. Cl.$^5$ .......................... G03B 1/04; G11B 15/67
[52] U.S. Cl. ...................................... 242/195; 360/95; 226/92
[58] Field of Search .......................... 242/195; 360/95; 74/569; 226/92, 91

[56] References Cited

U.S. PATENT DOCUMENTS

| | | | |
|---|---|---|---|
| 3,764,088 | 10/1973 | Yamada et al. | 242/195 |
| 4,243,186 | 1/1981 | Peter et al. | 242/195 |
| 4,399,936 | 8/1983 | Rueger | 242/195 |
| 4,608,614 | 8/1986 | Rinkleib et al. | 360/95 |
| 4,704,645 | 11/1987 | Murphy et al. | 242/195 X |
| 4,742,407 | 5/1988 | Smith et al. | 360/95 |
| 4,949,914 | 8/1990 | Barton, Jr. | 242/195 |

Primary Examiner—William A. Cuchlinski, Jr.
Assistant Examiner—C. W. Fulton
Attorney, Agent, or Firm—Duft, Graziano & Forest

[57] ABSTRACT

The tape threading mechanism threads a magnetic tape from a magnetic tape cartridge along a tape transport path to a take-up reel by using a two-member, spring loaded tape threading arm which uses two cam surfaces to control the articulation of the spring-loaded tape threading arm. A cam follower formed on the upper end of a leader block locating pin of the tape threading arm engages a short cam surface at the beginning of the tape transport path to guide the leader block of the magnetic tape along a short distance at which time the tape threading arm is smoothly accelerating. Once the cam follower disengages from the cam surface, the spring-loaded tape threading arm is locked into a fixed radius which allows the magnetic tape to maintain a constant velocity through approximately three hundred degrees of rotation, at which time the cam follower engages a second cam surface. The second cam surface guides the cam follower and leader block into position to engage the take-up reel. This cam engagement allows the magnetic tape to smoothly decelerate. The smooth acceleration and deceleration and constant velocity in between reduces the changes in tension of the magnetic tape as well as allows the magnetic tape to move at a much higher velocity.

18 Claims, 4 Drawing Sheets

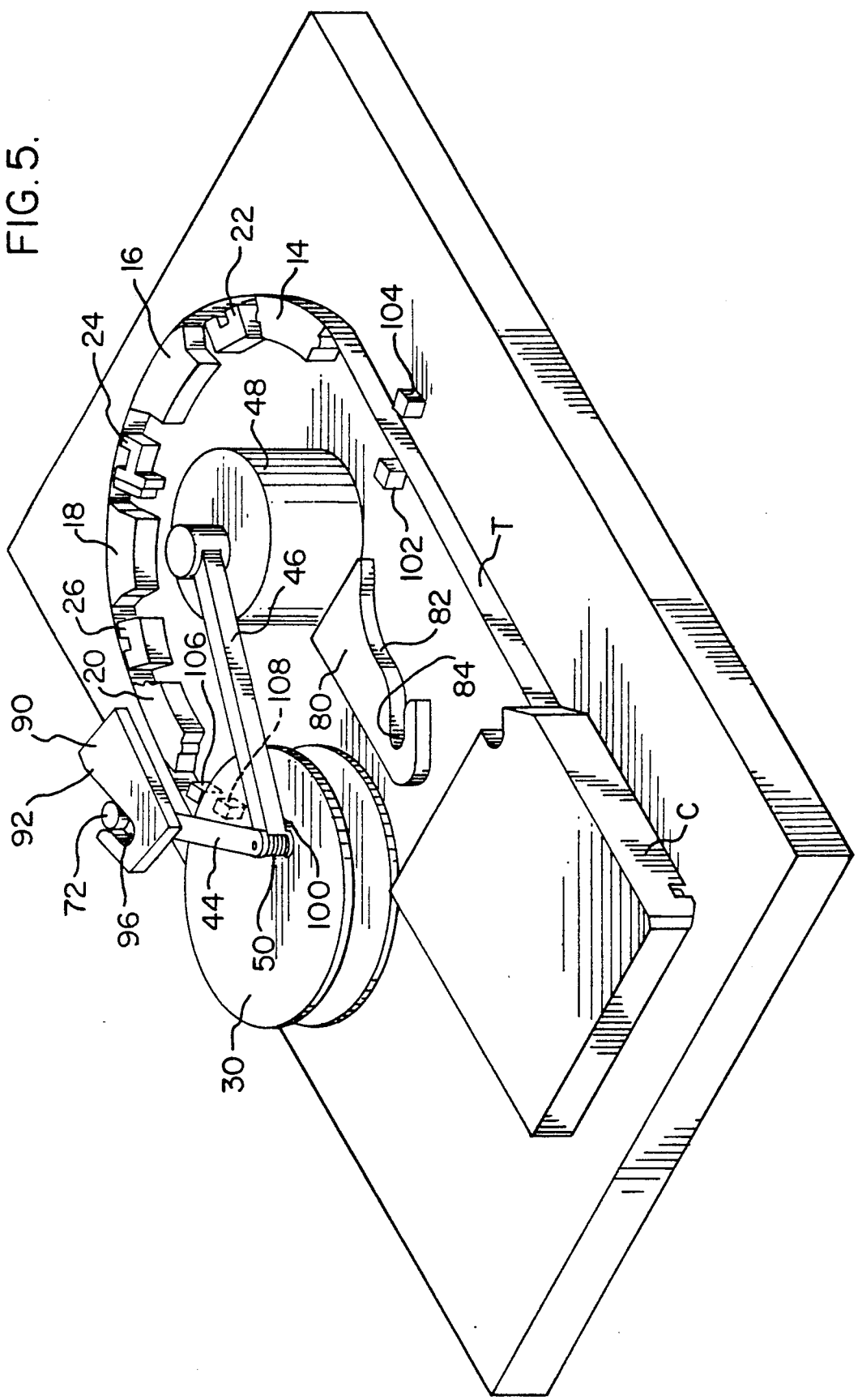

TAPE THREADING MECHANISM

FIELD OF THE INVENTION

The present invention relates to the field of magnetic tape threading mechanisms for threading a magnetic tape around a tape path in a tape drive.

PROBLEM

Complex tape drive systems are normally used for transferring information into or out of computer systems. The transfer of information is usually handled via magnetic tape cartridges, such as the IBM standard 3480-type magnetic tape cartridge. A magnetic tape cartridge is inserted into a tape drive system, wherein a tape threading arm uses a leader block locating pin to retrieve the leader block from the magnetic tape cartridge. The tape threading arm then threads the leader block and the attached magnetic tape around a tape threading path, which includes tape guides, tape cleaners and magnetic read/write heads, to a take-up reel in the tape drive. The tape threading arm inserts the leader block into the take-up reel, and the take-up reel motor then winds the magnetic tape onto the take-up reel. Information is read from the magnetic tape or recorded onto the magnetic tape as the magnetic tape travels by the read/write heads and is wound on the take-up reel.

The prior tape threading mechanisms are typically a pentocam linkage which uses a cam following roller to contact a cam and control the articulation of a hinged portion of the tape threading arm. The pentocam linkage is non-cylindrical in shape, which alters the radius of the tape threading arm as it rotates through the tape path. Thus, the tape threading arm imparts a nonuniform velocity to the leader block and the attached magnetic tape as the magnetic tape traverses the tape path. Changes occur in the velocity of the leader block and magnetic tape during the tape threading operation due to changes in radius of the tape threading arm. These accelerations and decelerations of the magnetic tape cause corresponding changes in the tension of the magnetic tape. The changes in the velocity of the magnetic tape and the changes in tape tension degrade the tape performance and negatively impact the data read/write operations.

Another problem with the prior tape threading mechanisms is that the shapes of the pentocam and cam path restrict the speed at which the tape threading operation takes place. The cam following roller is also typically mounted on a different linkage of the tape threading arm than the leader block locating pin. The precision with which the leader block is guided along the tape path and inserted into the take-up reel is severely limited by the difference in location of the cam following roller and the leader block locating pin.

Thus, prior tape threading mechanisms, that use complex multi-linkage arms, have limited operating speed, inaccurate operation and nonuniform tape tension.

SOLUTION

The present invention provides a tape threading mechanism for guiding a magnetic tape along a tape transport path to a take-up reel in a tape drive system. The tape threading mechanism of the present invention threads the magnetic tape in a manner to reduce changes in the tension of the magnetic tape while transporting the magnetic tape at a relatively high rate of speed.

In a preferred embodiment of the present invention, the tape threading mechanism includes a two member tape threading arm which is reversibly rotatably driven. The two members of the tape threading arm are pivotally connected to one another for movement between an open position and a locked fixed radius position. A torsion spring biases the two members inward toward one another in the locked fixed radius position. The free end of the tape threading arm includes a leader block locating pin for engagement with a leader block of a magnetic tape cartridge inserted into the tape drive system. A cam follower is affixed to the upper end of the leader block locating pin and aligned along the vertical axis of the leader block locating pin. A cam member is affixed to the tape drive system adjacent to the area of the inserted magnetic tape cartridge. The cam member extends only a short distance along the tape transport path. The cam follower engages the cam surface of the cam member and is resiliently biased against the cam surface by the torsion spring connection between the two tape threading arm members.

The cam follower is guided by the cam surface of the cam member and thus the leader block locating pin is guided from the area adjacent the magnetic tape cartridge to the tape transport path. As the cam follower disengages from the cam member, the torsion spring biasing between the two tape threading arm members causes the tape threading arm to lock into a fixed radius as the magnetic tape from the magnetic tape cartridge is threaded along the tape transport path through approximately three hundred degrees.

The cam follower engages a cam surface on a second cam member after the magnetic tape is threaded around the tape transport path. The second cam member is affixed to the tape drive system adjacent to the take-up reel. The cam surface of the second cam member causes the tape threading arm to move out of the locked fixed radius position and guide the leader block locating pin and leader block into position to insert the leader block into the take-up reel.

Optical sensors mounted near each of the cam surfaces activate the control circuitry to control the acceleration and deceleration of the tape threading arm. The smooth acceleration and deceleration of the tape threading arm and the constant velocity movement of the tape threading arm through most of the tape threading process reduces the variation in the magnetic tape tension as well as increases the speed of the tape threading process. Also, the use of cam surfaces and the location of the cam follower in vertical alignment with the leader block insertion pin provide greater accuracy in retrieving, guiding and inserting the leader block.

BRIEF DESCRIPTION OF THE DRAWINGS

FIG. 5 is a perspective view of the magnetic tape as threaded by the embodiment of FIG. 1.

DETAILED DESCRIPTION

Figure 1:
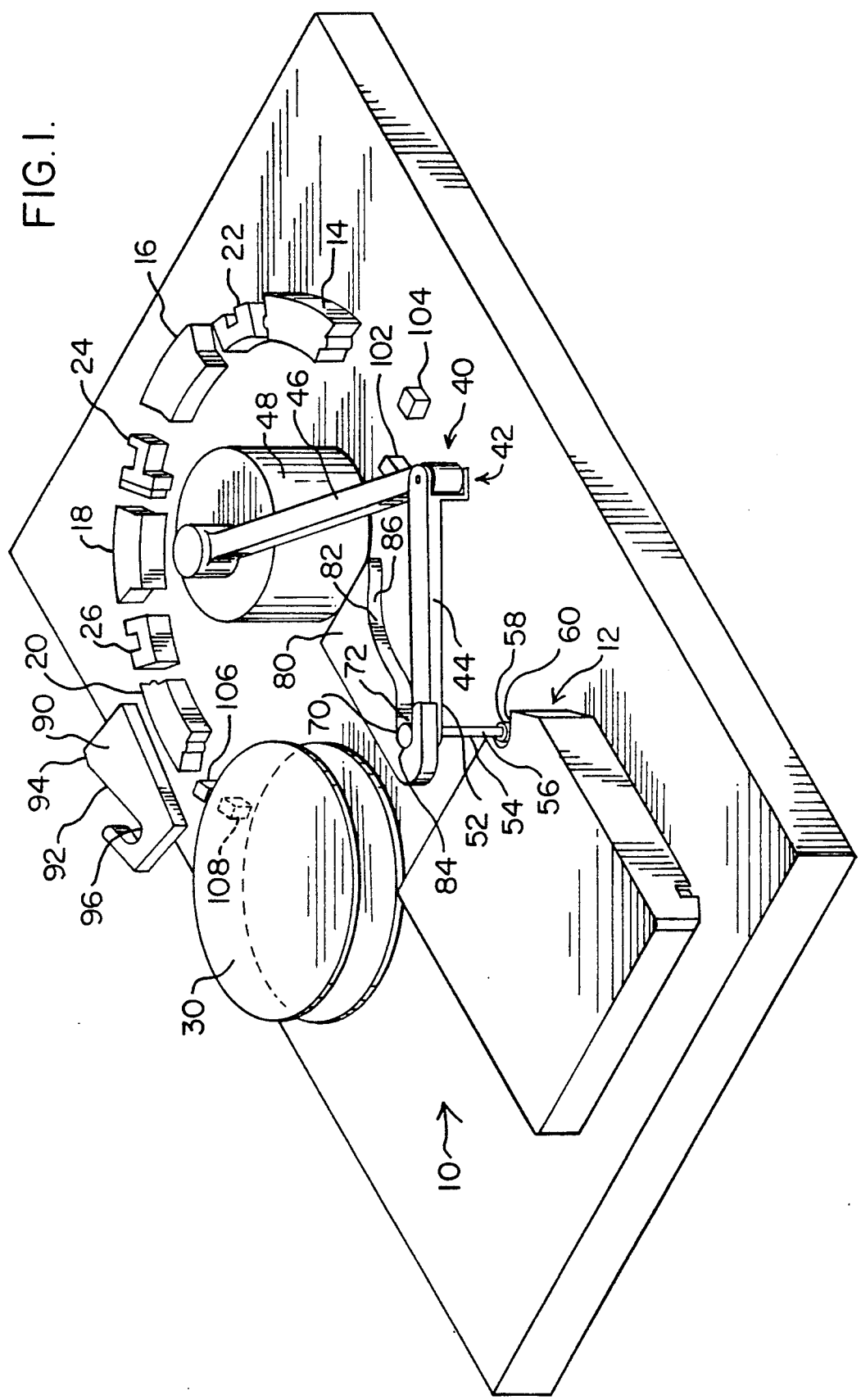
FIG. 1 is a perspective view of a preferred embodiment of the present invention.

The present invention provides a tape threading mechanism for tape drive systems. The tape drive systems are normally used for transferring information via magnetic tape cartridges between computer systems. The tape threading mechanism of the present invention threads the magnetic tape along a tape transport path with a smooth velocity profile to provide constant tension on the magnetic tape. The tape threading mechanism also increases the speed of the threading operation and improves the accuracy of the tape leader block insertion and guiding operations.

A preferred embodiment of the present invention is illustrated in FIGS. 1-5. Tape drive 10, shown in FIG. 1, includes magnetic tape cartridge entry port 12 for a magnetic tape cartridge, such as magnetic tape cartridge C, inserted into tape drive 10. Tape drive 10 is normally encased in a closed housing. However, for purposes of describing the present invention, the extraneous structure not necessary for the explanation of the present invention is omitted. Magnetic tape T from magnetic tape cartridge C is transported around air bearings 14, 16, 18 and 20 to pass adjacent to tape cleaners 22, 26 and magnetic read/write head 24. Air bearings 14-20 provide guidance and support for the magnetic tape T while magnetic read/write head 24 transfers data to and from the magnetic tape T. The magnetic tape T is wound about take-up reel 30 during the data read/write process.

Figure 2:
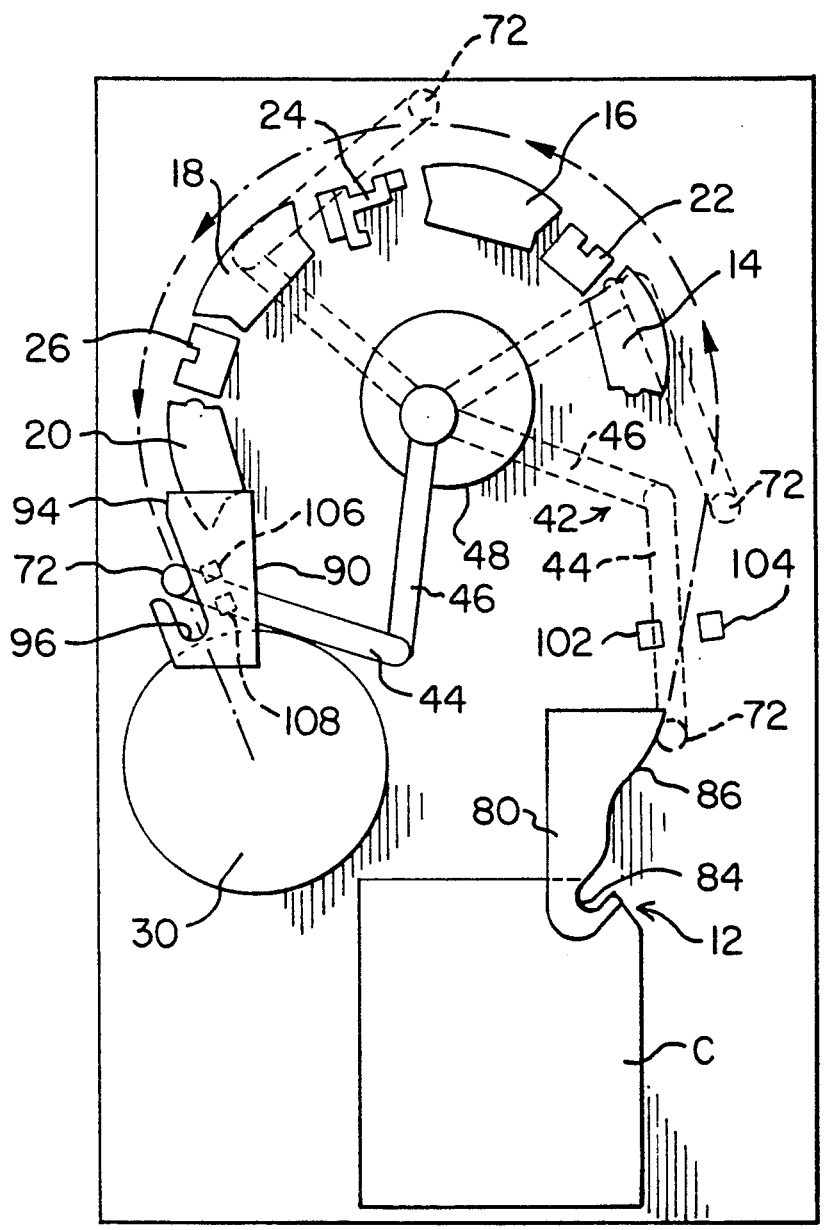
FIG. 2 is a top view of the embodiment of FIG. 1.

In large computer systems, it is important to maximize both the speed and accuracy of threading the magnetic tape along the tape transport path to the take-up reel 30 and then back to the magnetic tape cartridge C after the data read/write process is complete. The present invention provides tape threading mechanism 40, shown in FIGS. 1-5, to guide the magnetic tape T from magnetic tape cartridge C around the tape transport path in front of air bearings 14-20 and magnetic head 24 to take-up reel 30, as shown in FIGS. 1 and 2.

Tape Threading Arm

Tape threading mechanism 40 includes tape threading arm 42 having a first arm member 44 and a second arm member 46. Second arm member 46 is affixed to motor 48 which reversibly rotates second arm member 46 between a first position adjacent an inserted magnetic tape cartridge C and a second position adjacent take-up reel 30, as discussed below.

First arm member 44 is pivotally mounted by a pin, not shown, on the outer end of second arm member 46 to permit first arm member 44 to pivot relative to second arm member 46 from a locked, fixed radius position to an open position. Torsion spring 50, shown in FIG. 3, biases first arm member 44 toward second arm member 46 to the locked fixed radius position.

Leader block locating pin 54, shown in FIG. 1, is mounted on free end 52 of first arm member 44. Leader block locating pin 54 includes reduced diameter portion 56 extending below first arm member 44 with a lower end portion 58 of leader block locating pin 56 having an enlarged diameter. Reduced diameter portion 56 is dimensioned for insertion into leader block 60 of the magnetic tape cartridge C. Leader block 60 of magnetic tape cartridge C, shown in FIG. 4, includes angularly oriented slot 62 having resilient side walls 64, 66. The opposing end of leader block 60 is secured to the magnetic tape T of the magnetic tape cartridge C. First arm member 44, as magnetic tape cartridge C is inserted into entry port 12, forces reduced diameter portion 56 of leader block locating pin 54 into engagement within slot 62 of leader block 60. The resilient engagement of side walls 64, 66 of slot 62 with reduced diameter portion 56 of leader block locating pin 54 secures leader block 60 to leader block locating pin 54 to allow leader block locating pin 54 and thus tape threading arm member 44 to retrieve the magnetic tape from magnetic tape cartridge C for the tape threading process.

Cam Members

Cylindrical cam follower 72, shown in FIGS. 1 and 2, is included on upper end 70 of leader block locating pin 54. Cam follower 72 is concentric with reduced diameter portion 56 of leader block locating pin 54. Cam member 80 is affixed to tape drive 10 in a manner, not shown, such as by attachment to the base of the tape drive or the housing of the tape drive. Cam member 80 includes cam surface 82 having a first surface portion 84 aligned above magnetic tape cartridge C so that leader block locating pin 54 engages slot 62 of leader block 64 as cam follower 72 abuts against the end of cam surface 84. Cam surface 80 further includes cam surface portion 86 which guides cam follower 72 to a position where first arm member 44 is biased into the locked position having a fixed radius of a length that threads the magnetic tape from magnetic tape cartridge C along the tape transport path in front of the air bearings 14-20 and tape read/write head 24.

The biasing force from torsion spring 50 also biases cam follower 72 against cam surface 82 of cam member 80 so that as second arm member 46 is rotated by motor 48, cam follower 72 follows cam surface 80 moving leader block locating pin 54 and leader block 60 along the path of cam surface 82. Since leader block locating pin 54 is vertically aligned with cam follower 72, leader block locating pin 54 is accurately aligned with leader block 60 for insertion therewith as cam follower 72 engages cam surface 84. Also, the leader block 60 and the magnetic tape T attached thereto is precisely threaded along the tape transport path.

Once cam follower 72 leaves cam surface 82, as shown in FIG. 2, torsion spring 50 biases first arm member 44 inward to the locked fixed radius position. This provides constant velocity movement of leader block locating pin 54 and thus the magnetic tape T along the majority of the tape transport path. As leader block 60 approaches take-up reel 30, cam follower 72 engages a second cam member 90. Cam member 90 is affixed to the tape drive mechanism in a manner similar to cam member 80. Cam member 90 includes a cam surface 92 having a first cam surface portion 94 and a second cam surface portion 96. First arm member 44 is opened up against the bias of torsion spring 50 as cam follower 72 engages surface portion 94 so that leader block 60 is guided into take-up reel 30, as shown in FIG. 5, as cam follower 72 moves along surface 92 to abut against surface portion 96.

Control Units

Figure 3:
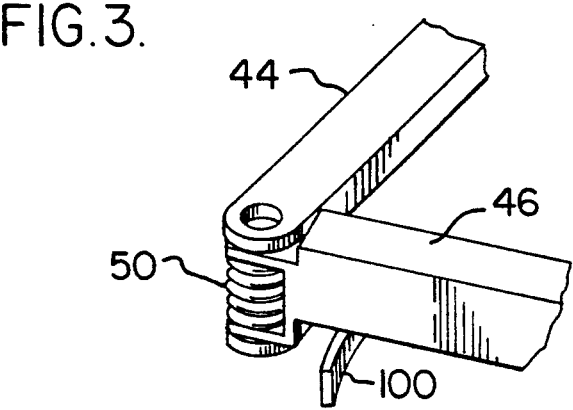
FIG. 3 is a detail view of the spring-biased connection between arm members.
Figure 4:
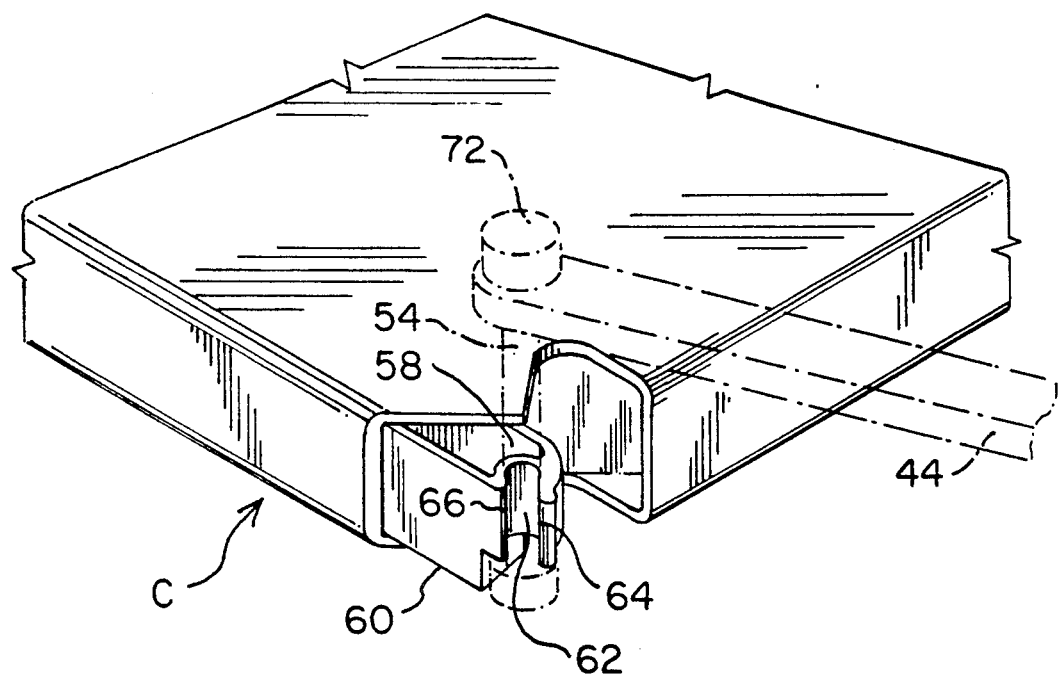
FIG. 4 is a detail view of the leader block assembly of a magnetic tape cartridge.

Flag member 100, shown in FIGS. 3 and 5 is formed on the lower portion of second arm member 46 near the connection with first arm member 44. Optical sensors 102, 104 are mounted near cam member 80. Optical sensors 106, 108 are mounted near cam member 90. As cam follower 72 disengages cam surface 80, flag member 100 interrupts the optical circuit between optical sensors 102, 104 to send a signal to a control circuit, not shown, to activate motor 48 to rotate tape threading arm 42 at a constant velocity. As flag member 100 passes between optical sensors 106, 108, a signal is sent to the control circuit to decelerate motor 48 as cam follower 72 engages cam surface 92.

When the magnetic tape is wound back into magnetic tape cartridge C after the information is transferred, the reverse tape threading process occurs. Motor 48 rotates tape threading arm 42 so that cam follower 72 moves against cam surface 92. As cam follower 72 disengages from cam member 90, flag member 100 interrupts the optical circuit between optical sensors 104, 106 so that motor 48 rotates tape threading arm 42 at a constant velocity until flag member 100 interrupts the optical circuit between optical sensors 102, 104. The motor 48 causes tape threading arm 42 to decelerate as cam follower 72 engages cam surface 80. Cam follower 72 engages cam surface 84 as leader block 60 is reinserted into magnetic tape cartridge C. Leader block locating pin 54 is disengaged from leader block 60 as the magnetic tape cartridge C is removed from the tape drive.

SUMMARY

The operation of the present invention, as illustrated by the above description of a preferred embodiment, threads magnetic tape from a magnetic tape cartridge along a tape transport path to a take-up reel in a smooth and relatively high speed process. The threading mechanism uses two-member, spring-loaded tape threading arm 42 with cam surfaces 80, 90 to control the articulation of spring-loaded tape threading arm 42. Spring-loaded tape threading arm 42 engages leader block 60 of a magnetic tape cartridge C by inserting leader block locating pin 54 affixed to tape threading arm 42 into the slot of the leader block 60. Cam follower 72 formed on the upper end of the leader block locating pin 54 engages short cam surface 82 to guide leader block 60 and thus the magnetic tape T, as shown in FIG. 5, of the magnetic tape cartridge C along a short distance at which time tape threading arm 42 is smoothly accelerating. Once cam follower 72 disengages from cam surface 82, spring-loaded tape threading arm 42 is biased into a fixed radius which allows the magnetic tape T to maintain a constant velocity through approximately three hundred degrees of rotation until cam follower 72 engages cam surface 92. Cam surface 92 guides cam follower 72 and leader block 60 into position to insert leader block 60 into take-up reel 30. This cam engagement allows the magnetic tape T to smoothly decelerate. The smooth acceleration and deceleration and constant velocity of the leader block 60 in between reduces the variations in tension of the magnetic tape T as well as allows the magnetic tape T to move at a much higher velocity than previously. Further, the cam surfaces increase the accuracy and guiding time of the leader block insertion. Also, the location of the cam follower and leader block locating pin along the same vertical axis aids in the accuracy of the leader block threading and inserting process.

The present invention is not meant to be limited by the above description of a preferred embodiment but encompasses other embodiments and modifications within the scope of the inventive concept.

We claim:

1. A tape threading apparatus for threading tape from a tape cartridge along a tape transport path to a take-up reel, said apparatus comprising:

first cam surface means affixed to said tape threading apparatus at a first location adjacent the tape cartridge;

second cam surface means affixed to said tape threading apparatus at a second location adjacent the take-up reel;

tape threading arm means for transporting said tape from said tape cartridge to said take-up reel;

means connected to said tape threading arm means for rotating said tape threading arm means around a pivot point;

wherein said tape threading arm means comprises:

cam follower means mounted on said tape threading arm means for engaging said first cam surface and for engaging said second arm surface, tape engaging means affixed on said tape threading arm means for engaging said tape to transport said tape around said tape transport path to said take-up reel, and means for maintaining said tape engaging means at a fixed radius from said pivot point, as said tape threading arm means is rotated between said first cam means and said second cam means.

2. The apparatus of claim 1 wherein said first cam surface provides smooth acceleration of said tape engaging means along a first predetermined distance;

said second cam surface provides smooth deceleration of said tape engaging along a second predetermined distance; and said maintaining means moves said tape engaging means at a constant velocity between said first cam surface and said second cam surface.

3. The apparatus of claim 1 wherein said tape threading arm means include:

a first arm member having a first end affixed to said rotating means;

a second arm member pivotally mounted on a second end of said first arm member and having said cam follower means mounted on said second arm member; and means for biasing said second arm member relative to said first arm member.

4. The apparatus of claim 3 wherein said second arm member is pivotally movable relative to said first arm member from a locked position wherein said tape engaging means pivots about a fixed radius and an unlocked position wherein said tape engaging means is moved according to said first cam surface and said second cam surface.

5. The apparatus of claim 4 wherein said spring means include a torsional spring affixed to said first arm member and said second arm member to bias said second arm member into said locked position when said cam follower means is disengaged from said first cam surface and said second cam surface.

6. The apparatus of claim 1 wherein said cam follower means is aligned on the same vertical axis as said tape engaging means.

7. The apparatus of claim 1 wherein said apparatus further comprises:

first sensing means for sensing the position of said tape engaging means relative to said first cam surface; and second sensing means for sensing the position of said tape engaging means relative to said second cam surface.

8. The apparatus of claim 7 wherein said first sensing means include optical sensing means; and said second sensing means include optical sensing means.

9. A tape threading system for threading the tape from a tape cartridge along a tape transport path to a take-up reel, said system comprising:
   tape threading arm means for threading said tape along the tape transport path;
   means for guiding said tape threading arm means along a first predetermined distance from initially engaging said tape from said tape cartridge;
   means for rotating said tape threading arm means around a pivot point to move said tape at a constant velocity along a second predetermined distance along said tape transport path;
   means for guiding said tape along a third predetermined distance adjacent the take-up reel for engagement with said take-up reel; and
   tap engaging means affixed on said tape threading arm means for engaging said tape to transport said tape around said tape transport path to said take-up reel,
   means for maintaining said tape engaging means at a fixed radius form said pivot point, as said tape treading arm means is rotated between said first cam means and said second cam means.

10. The system of claim 9 wherein:
    said means for guiding said tape threading arm means along said first predetermined distance includes a first cam surface;
    said means for guiding said tape threading arm means along said third predetermined distance includes a second cam surface; and
    said tape threading arm means includes cam follower means for engagement with said first cam surface and said second cam surface.

11. The system of claim 10 wherein said tape threading arm means includes:
    a first arm member mounted onto said rotating means; and
    a second arm member pivotally mounted to said first arm member for relative movement between a fixed radius position and an open position.

12. The system of claim 11 wherein said tape threading arm means further include:
    said cam follower means affixed to said second arm member; and
    means for biasing said cam follower means against said first cam surface and against said second cam surface wherein as said first arm member is rotated, said tape engaging means are guided by said first cam surface adjacent said tape cartridge and by said second cam surface adjacent said tape cartridge and at said fixed radius as said cam follower is between said first cam surface and said cam surface.

13. The system of claim 12 wherein said cam follower means are fixed to said second arm member along the same vertical axis as said tape engaging means.

14. The system of claim 12 wherein said biasing means include a torsional spring mounted between first arm member and said second arm member.

15. The system of claim 10 wherein said system further comprises first sensing means for sensing the position of said tape threading arm means relative to said first cam surface and second sensing means for sensing the position of said tape threading arms means relative to said second cam surface.

16. A method for threading tape from a tape cartridge along a tape transport path to a take-up reel, said method comprising the steps of:
    providing a first cam surface adjacent the tape cartridge;
    providing a second cam surface adjacent the take-up reel;
    providing a rotatable tape threading arm having a pivotable member;
    providing means for rotating said tape threading arm;
    providing a tape engaging member on said pivotable member and cam following means on said pivotable member;
    engaging said tape at said tape cartridge with said tape engaging member;
    moving said tape at a smooth acceleration rate as said cam following means engages said first cam surface;
    locking said pivotable member into a fixed radius as said cam following means no longer engages said first cam surface to rotate said tape at a constant velocity along said tape transport path; and
    moving said tape at a smooth deceleration rate as said cam follower means engages said second cam surface so that said tape can engage said take-up reel.

17. The method of claim 16 wherein said cam following means are aligned on the same vertical axis as said tape engaging member.

18. The method of claim 16 wherein said method further comprises the steps of:
    providing sensing means adjacent said first cam surface and said second cam surface to sense the movement of said threading arm near said first cam surface and said second cam surface to control the acceleration and deceleration of said threading arm.

* * * * *